(12) United States Patent
Jahnke

(10) Patent No.: US 9,909,580 B2
(45) Date of Patent: Mar. 6, 2018

(54) REDUCED TORQUE VALVE COVER LOCK ASSEMBLY

(71) Applicant: Premium Oilfield Technologies, LLC, Houston, TX (US)

(72) Inventor: Douglas A. Jahnke, Houston, TX (US)

(73) Assignee: Premium Oilfield Technologies, LLC, Houston, TX (US)

(*) Notice: Subject to any disclaimer, the term of this patent is extended or adjusted under 35 U.S.C. 154(b) by 63 days.

(21) Appl. No.: 15/186,234

(22) Filed: Jun. 17, 2016

(65) Prior Publication Data

US 2017/0089334 A1 Mar. 30, 2017

Related U.S. Application Data

(60) Provisional application No. 62/180,803, filed on Jun. 17, 2015.

(51) Int. Cl.
| | |
|---|---|
| *F04B 53/10* | (2006.01) |
| *F16K 27/08* | (2006.01) |
| *F04B 39/14* | (2006.01) |
| *E21B 43/12* | (2006.01) |
| *F04B 53/16* | (2006.01) |
| *F04B 47/02* | (2006.01) |

(52) U.S. Cl.
CPC ............ *F04B 53/10* (2013.01); *E21B 43/126* (2013.01); *F04B 39/14* (2013.01); *F04B 53/16* (2013.01); *F16K 27/08* (2013.01); *F04B 47/02* (2013.01); *Y10T 137/6086* (2015.04)

(58) Field of Classification Search
CPC .......... F04B 47/02; F04B 53/10; F04B 39/14; Y10T 137/6086

USPC ............................................. 138/89; 417/454
See application file for complete search history.

(56) References Cited

U.S. PATENT DOCUMENTS

| | | | | |
|---|---|---|---|---|
| 4,708,376 A | * | 11/1987 | Jennings ............... | E21B 33/038 285/18 |
| 6,783,337 B2 | * | 8/2004 | Nelson .................... | F04B 1/141 137/454.4 |
| 8,365,754 B2 | * | 2/2013 | Riley .................... | F04B 39/121 137/15.17 |
| 9,169,710 B2 | * | 10/2015 | Jahnke .................. | E21B 33/038 |
| 2005/0226754 A1 | * | 10/2005 | Orr ........................ | F04B 53/007 417/571 |
| 2015/0369689 A1 | * | 12/2015 | Kotlyar ................. | G01M 3/022 73/49.8 |

* cited by examiner

*Primary Examiner* — Kevin Murphy
(74) *Attorney, Agent, or Firm* — Locke Lord LLP

(57) ABSTRACT

A valve cover lock assembly for a pump having a fluid end module can include a ring adapted to couple to the module, an insert comprising a plurality of segments, and a cone adapted to couple with the insert, wherein the ring comprises a first coupler and the insert comprises a second coupler configured to couple with the first coupler, wherein the cone is configured to move one or more of the plurality of segments when the cone is moved, and wherein the first and second couplers are adapted to at least partially resist movement of the insert. A method of locking a valve cover can include coupling a ring to a valve cover opening, disposing an insert comprising a plurality of segments at least partially within the ring, coupling an actuator to the insert, and coupling the insert to the ring.

20 Claims, 11 Drawing Sheets

REDUCED TORQUE VALVE COVER LOCK ASSEMBLY

CROSS REFERENCE TO RELATED APPLICATIONS

This application claims the benefit of U.S. Provisional Patent Application No. 62/180,803 filed Jun. 17, 2016.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to valve cover locks.

Description of the Related Art

Wellbores drilled through subsurface rock formations to extract oil and gas may be treated by pumping various types of fluids and/or other materials into the formations. Fluid pumping treatments can include, for example, hydraulic fracturing, wherein fluid is pumped into the formation at pressures that exceed a fracture pressure of the formations. As another example, drilling mud can be pumped into or out of a wellbore or formation for purposes such as sealing off porous rock layers, equalizing pressures, cooling drilling components and flushing out cuttings, among others. Other fluid treatments may include, for example, pumping acid into the wellbore to dissolve minerals present in the pore spaces of the formation. In conducting fluid pumping treatments on one or more wells, pumping equipment can be used, which can include pumps (e.g., mud pumps, water pumps or other fluid pumps), connections, power sources, fluid ends, power ends, transmissions, motors, conduits and other components of pumping systems. At least some pumping equipment, such as pumps, can include parts or components that degrade over time during use, such as due to friction, temperature, pressure, exposure and the like, which can be referred to as wear components.

Referring now to FIG. 1, a drilling rig 1 for oil and gas operations may be used to drill a wellbore 2 in a reservoir 3 from a surface location 4, which may be or include a ground surface, a drilling platform, or any other location outside of the wellbore 2 from which drilling may be controlled. The drilling rig 1 can include a drill string 5 suspended therefrom, such as a drill string comprised of a continuous length of pipe assembled from a series of relatively short tubing sections, or tubulars 6, connected to one another. The drill string 5 can include one or more of many drilling tools, bottom hole assemblies or other components for hydrocarbon exploration, such as a drill bit 7. In at least some instances, drilling fluids 8 for supporting drilling operations, such as water, mud, lubricants, water-based or oil-based suspensions of clays, chemicals, particulates, coolants, other materials and/or combinations thereof, can be pumped into and/or out of a wellbore 2 during drilling operations, e.g., for purposes such as those mentioned above. For example, drilling fluids 8 can be pumped from location 4 down drill string 5 and back up through an annulus 9 of wellbore 2. However, this need not be the case and other pumping configurations are possible. Accordingly, a drilling rig 1 can include one or more pumps, such as mud pump 10, for pumping drilling fluids.

As shown in FIGS. 2 and 3, a conventional mud pump 10 can include a power end 12 and a fluid end 14. Power end 12 can be adapted to convert rotational movement from a motor or other power source (not shown) applied to one or more drive shafts 16 into linear movement or other movement for operating fluid end 14. Fluid end 14 can include one or more fluid end modules 18 having one or more inlets, or ports 20, and one or more outlets, or outlet ports 22, for routing drilling fluid, such as drilling mud, into and out of fluid end 14. Each module 18 can include one or more valves for drawing fluid through fluid end 14. The valves can be disposed within modules 18 and secured in place with valve cover locks 24 for supporting operation of the valves. More specifically valve cover locks 24 can be coupled to modules 18 for securing valve covers 26 in place during pumping operations. Conventional valve cover locks 24 can include a threaded ring 28 and a threaded valve pot cover 30 for keeping a valve cover 26 in place during pumping operations. However, because mud pumps can operate at relatively high pressures, for example up to 7500 pounds per square inch (PSI), valve cover locks 24 should be able to withstand forces applied to valve cover 26 during pumping. As shown in FIGS. 2 and 3, conventional, threaded valve pot covers 30 typically are large enough in diameter to allow for removal of valve cover 26 upon removal of cover 30 from ring 28. As a result, a relatively large amount of torque can be required to tighten cover 30 adequately to withstand the operating pressure of a mud pump. For example, for a pump expected to operate at approximately 7500 PSI, up to approximately 8000 or 9000 foot-pounds (ft-lbs) of torque can be needed to properly tighten a conventional cover 30 sufficiently to counteract forces applied to valve cover 26 during preloading operations performed prior to general pumping operations. As such, torques of this magnitude may not be feasible with equipment available at a typical well site and, thus, in at least some cases, conventional covers 30 may not be properly tightened prior to pumping operations.

As a result, the valve cover 26 can be subject to movement over time, or covers 30 can back out over time, for example due to vibrations or other forces experienced during pumping, which can result in reduced performance of the pump. For example, a pump may not be able to operate at its intended working pressure or wear parts may wear more quickly due to improper functioning of the valve resulting from improper placement or movement of valve cover 26. Regardless of whether conventional valve cover locks 24 are properly or otherwise adequately tightened, the valve pot covers 30 may be removed from time to time to service the pump, such as, for example, for servicing or replacing wear parts such as poppet 32, valve guide 34, or other pump components, such as gaskets, fasteners, springs and the like. Of course, the more time that may be needed to remove or replace a valve cover lock during servicing, the greater the down time may be for the pump.

Accordingly, a need exists in the art for a valve cover lock that can be more easily coupled or uncoupled from a pump or fluid end, such as by requiring relatively less torque for proper installation as compared to conventional locks of similar specifications, or by reducing an amount of time that may be needed to service a pump in a manner that may call for removal of one or more valve cover locks. The disclosures and teachings herein are directed to systems and methods for improved valve cover lock structures.

BRIEF SUMMARY OF THE INVENTION

A valve cover lock assembly can include a ring having an opening and a wall, such as a ring adapted to couple to a fluid end proximal to a valve cover opening, an insert comprising a plurality of segments, such as an insert being adapted to be disposed at least partially within the opening of the ring, a cone adapted to be at least partially disposed within an opening in the insert, and a coupler adapted to couple one or more other components of the assembly. In at least one embodiment, a coupler can include a cone nut adapted to couple with a valve cover. The ring can include one or more couplers and the insert can include one or more couplers adapted to couple with the coupler(s) of the ring. The cone can be adapted to move one or more of the plurality of segments, such as radially outwardly when the cone is moved in a direction relative to the insert, which can include moving one or more of the segments for coupling the insert and the ring, such as by coupling their respective couplers. A valve cover lock assembly can be adapted to at least partially resist movement of the insert relative to the ring, such as when in one or more locked positions, which can include being adapted to at least partially resist movement of a valve cover during a pumping operation.

DETAILED DESCRIPTION

Figure 1:
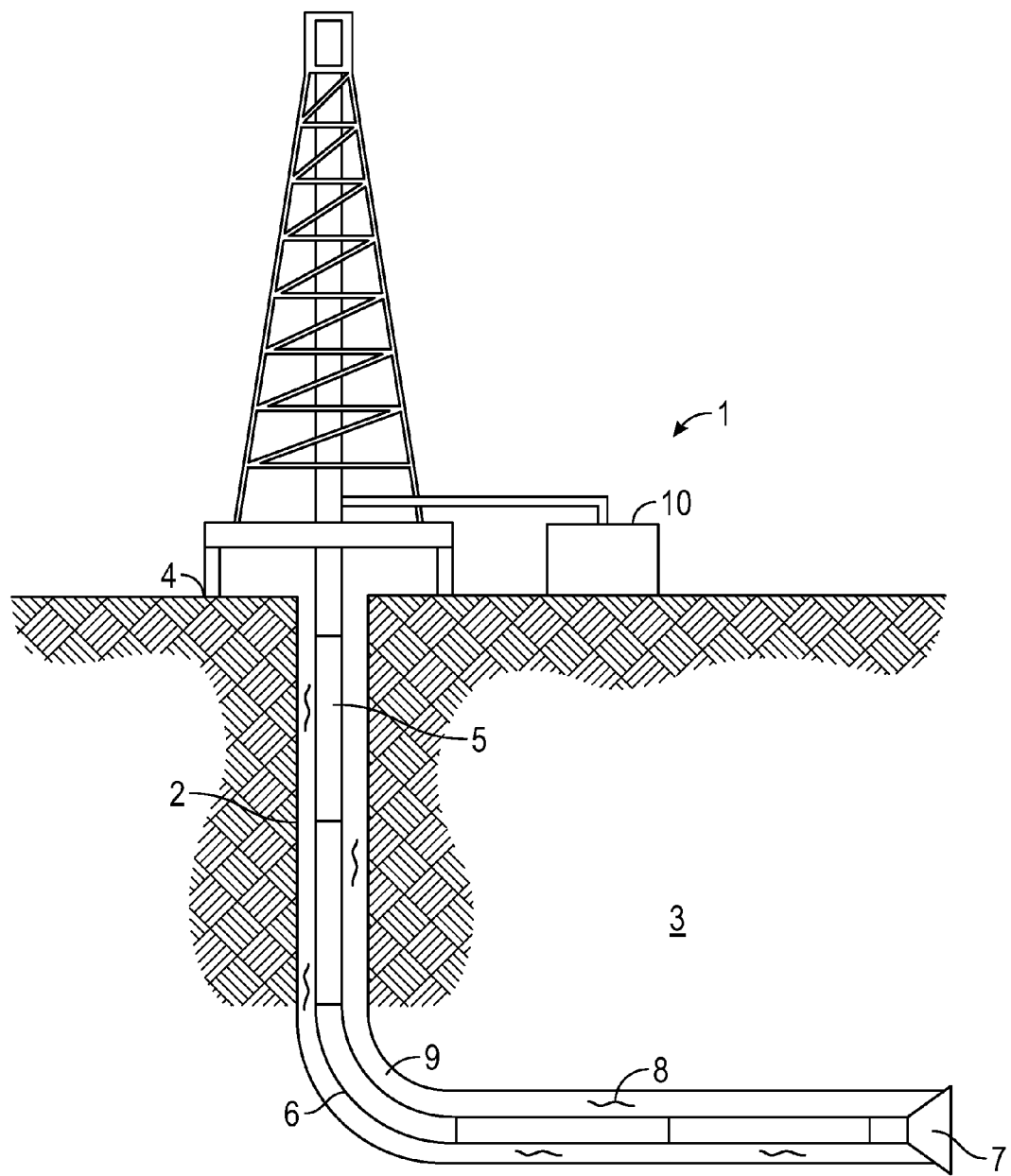
FIG. 1 is a schematic diagram of a drilling rig having a mud pump.
Figure 2:
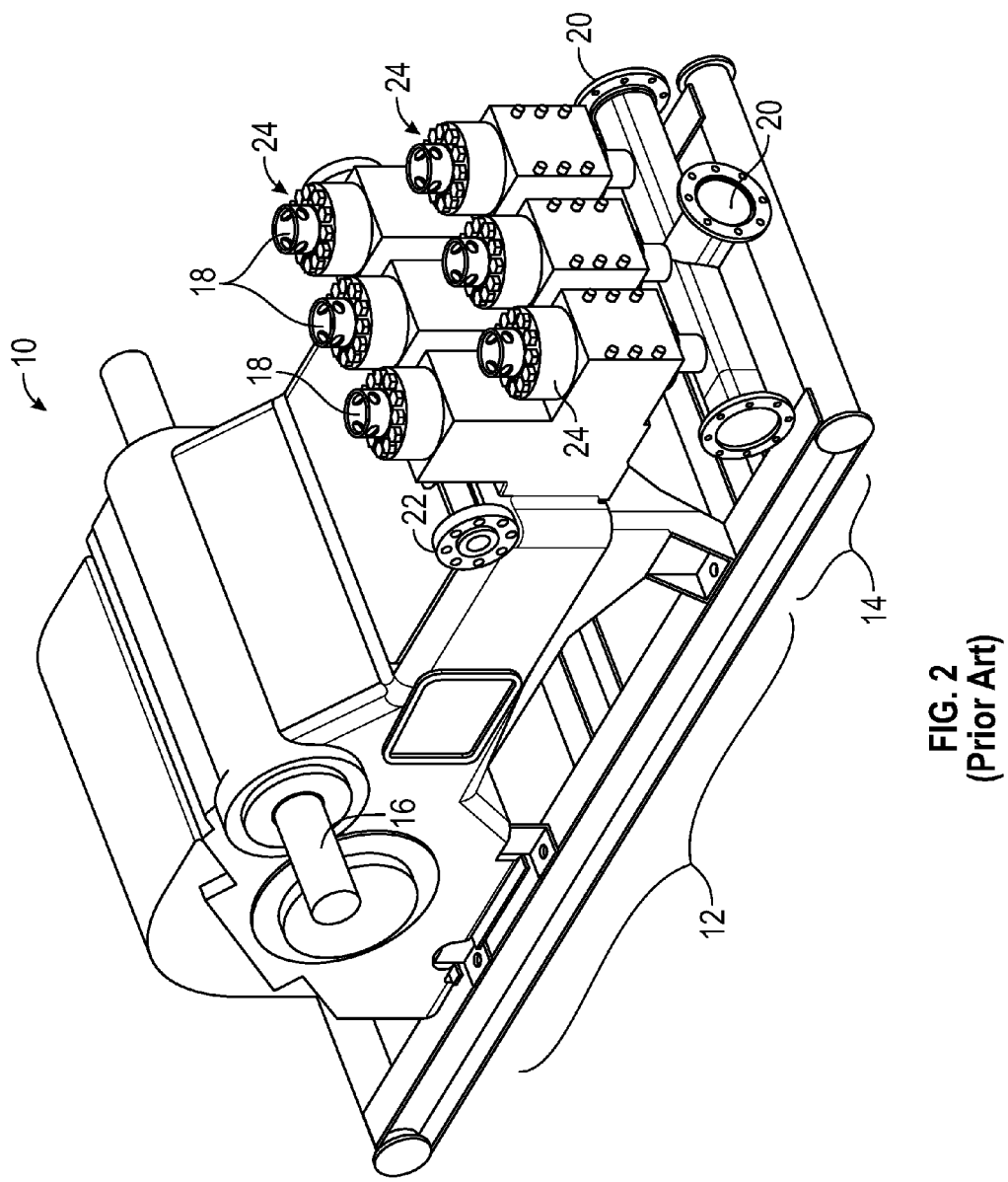
FIG. 2 is a perspective view of a conventional mud pump.
Figure 3:
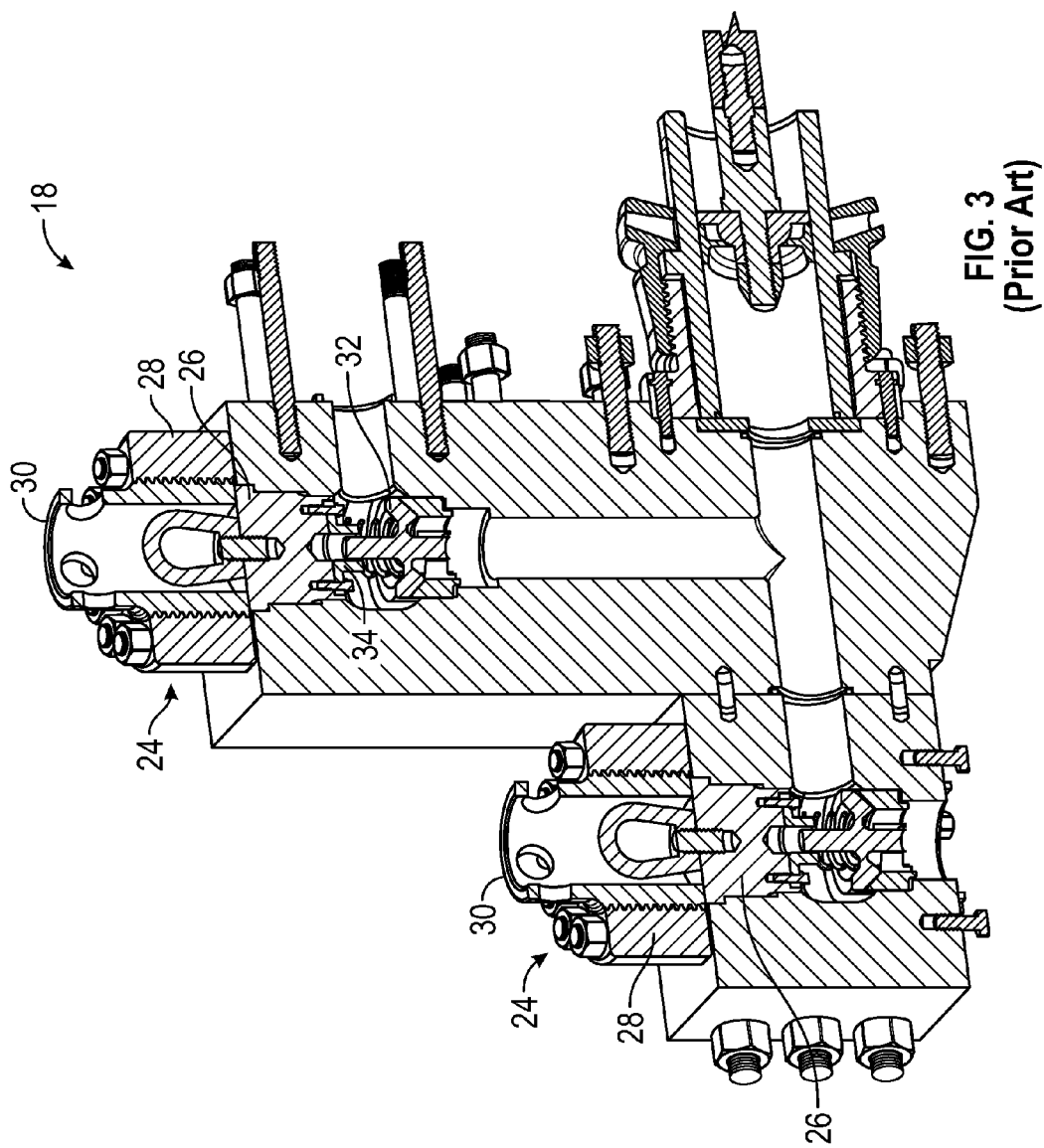
FIG. 3 is a perspective cross-sectional view of a portion of the fluid end of the mud pump of FIG. 2.

The Figures described above and the written description of specific structures and functions below are not presented to limit the scope of what Applicant has invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will appreciate that the development of an actual commercial embodiment incorporating aspects of the present disclosure can require numerous implementation-specific decisions to achieve the developer's ultimate goal for the commercial embodiment (s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having the benefits of this disclosure.

It should be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "front," "rear," "left," "right," "upper," "lower," "down," "up," "side," "first," "second," "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. The term "end" can, but need not, be or include a terminal end unless otherwise indicated. Notwithstanding any other language in the present disclosure, the embodiment(s) shown in the drawings are examples presented for purposes of illustration and explanation and are not the only embodiments of the subject(s) hereof.

Applicant has created systems and methods for improving valve cover locks and equipment having one or more valve cover locks, which can include, for example, reducing the time and equipment that may be required to install or remove a valve cover lock, enabling installation or removal of a valve cover lock using relatively less torque, providing for improved preloading of a fluid end, and/or improving the structural integrity of a valve system. In at least one embodiment, a system for locking a valve cover can include a plurality of components for keeping a valve cover in place during pumping operations, such as a ring for coupling the system to a fluid end module and a cover or insert for coupling to the ring and resisting force applied to the valve cover during pumping operations, whether directly or indirectly. A system can include an actuator for at least partially supporting coupling of an insert to a ring. A ring can be any shape or size, such as circular, round, polygonal or another shape, and can be annular or otherwise can have one or more openings therein or there through, such as a central longitudinal opening. A ring can be adapted for coupling with one or more other components of the system and for communicating with at least a portion of a pump (e.g., a mud pump), such as an opening in a fluid end module. An insert can be adapted for coupling with a ring for at least partially sealing an opening, which can include applying force to a valve cover or resisting force on a valve cover. For instance, a system for locking a valve cover, such as a valve cover lock assembly, can be coupled to a fluid end of a mud pump (e.g., to a fluid end module), and adapted for keeping a valve cover in a proper position for supporting pumping operations, as described in further detail with reference to the Figures.

Figure 4:
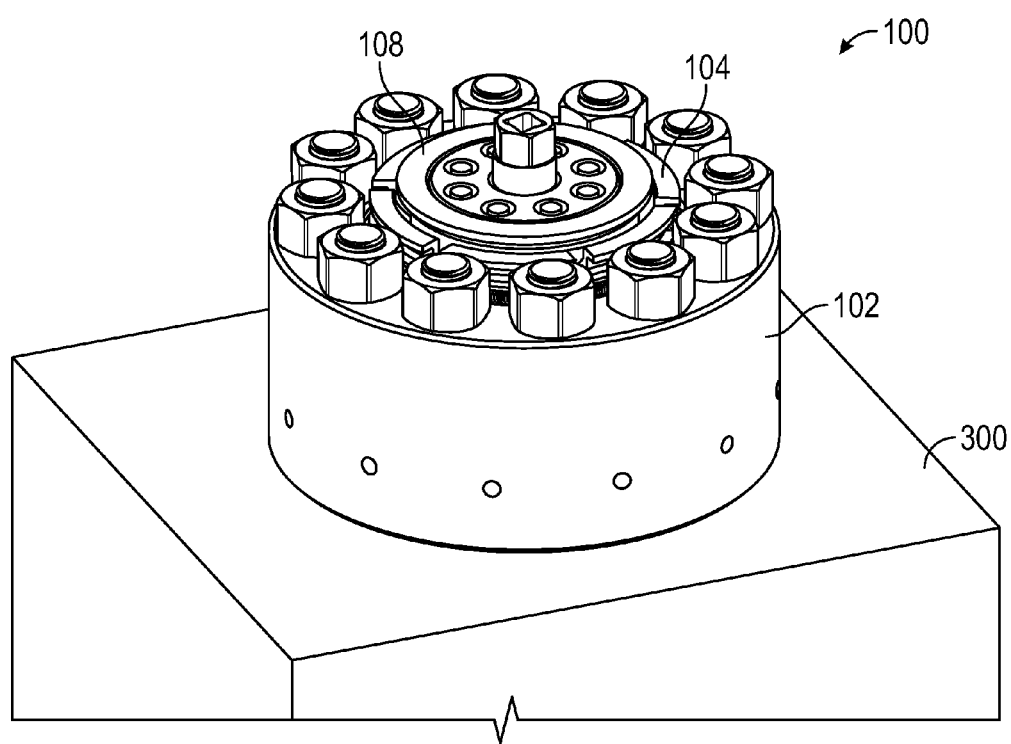
FIG. 4 is a perspective view of one of many embodiments of a valve cover lock assembly according to the disclosure.
Figure 5:
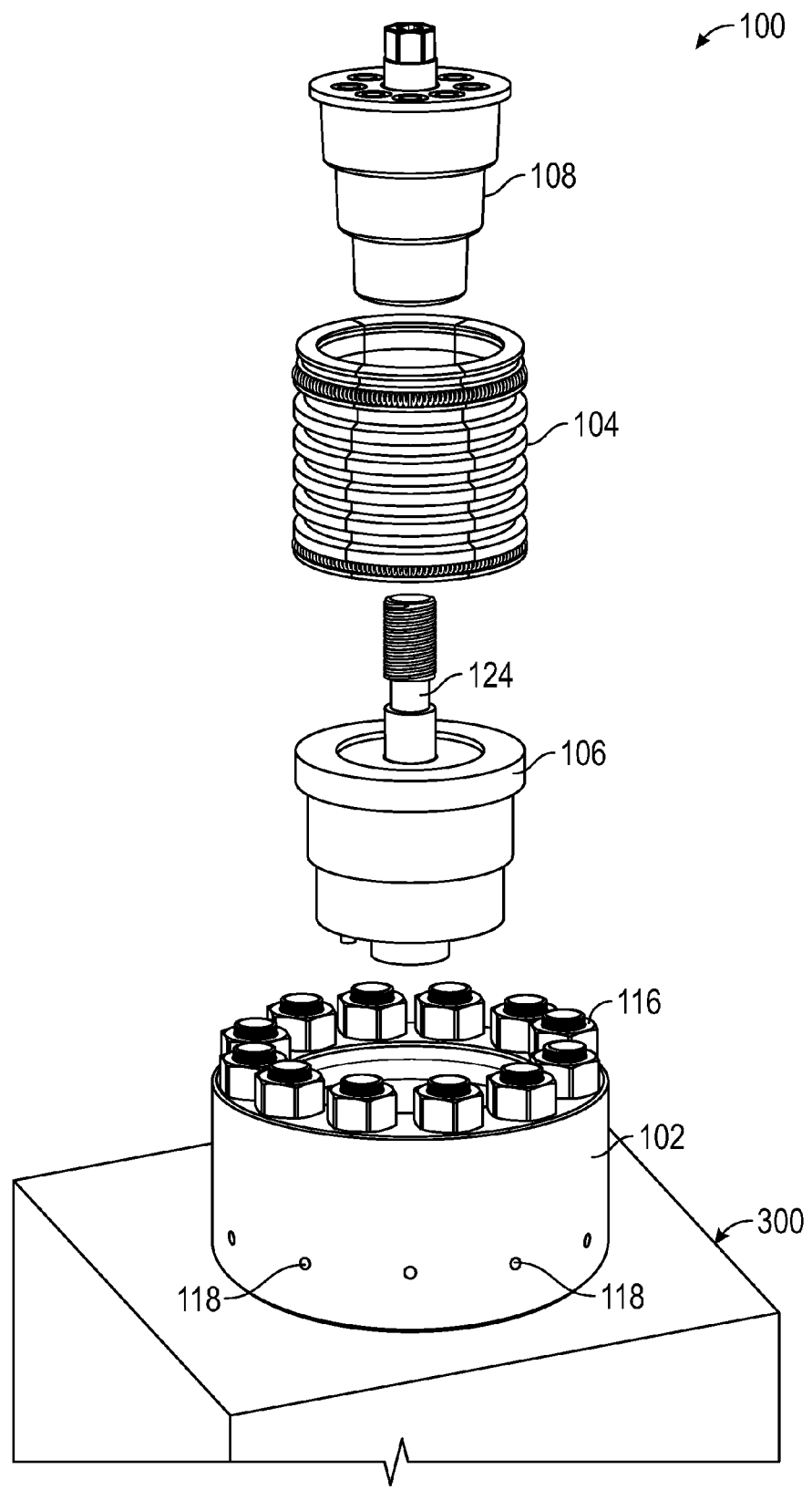
FIG. 5 is a perspective exploded view of the valve cover lock assembly of FIG. 4.
Figure 6:
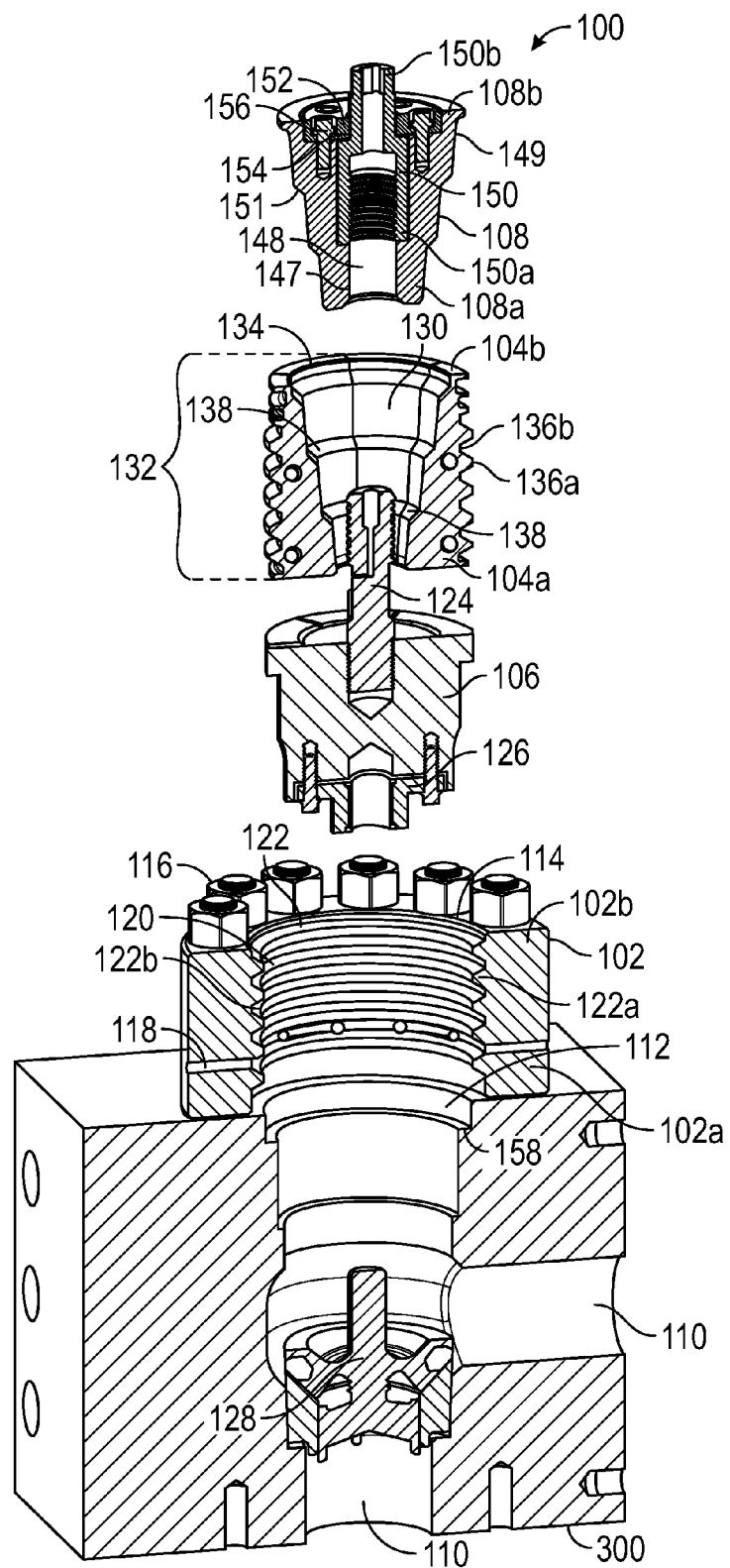
FIG. 6 is a cross-sectional view of the valve cover lock assembly of FIG. 5.
Figure 7A:
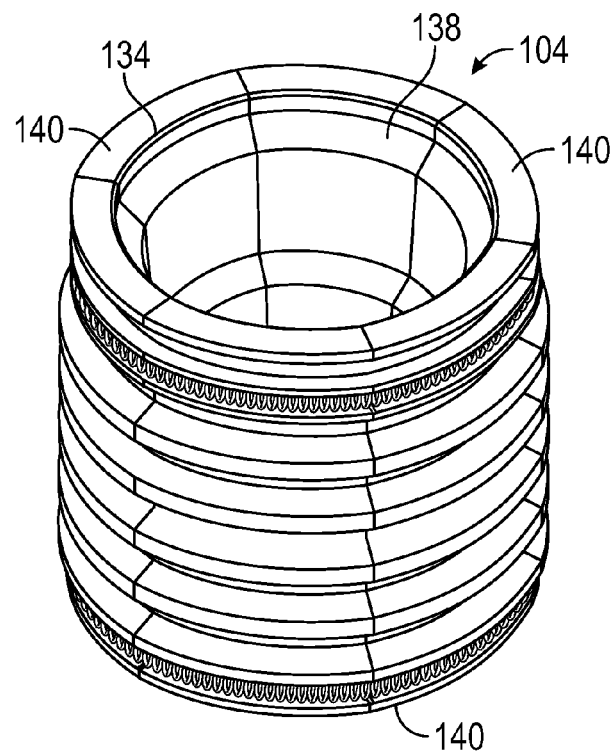
FIGS. 7A, 7B and 7C are perspective views of one of many embodiments of a valve cover lock insert according to the disclosure.
Figure 7B:
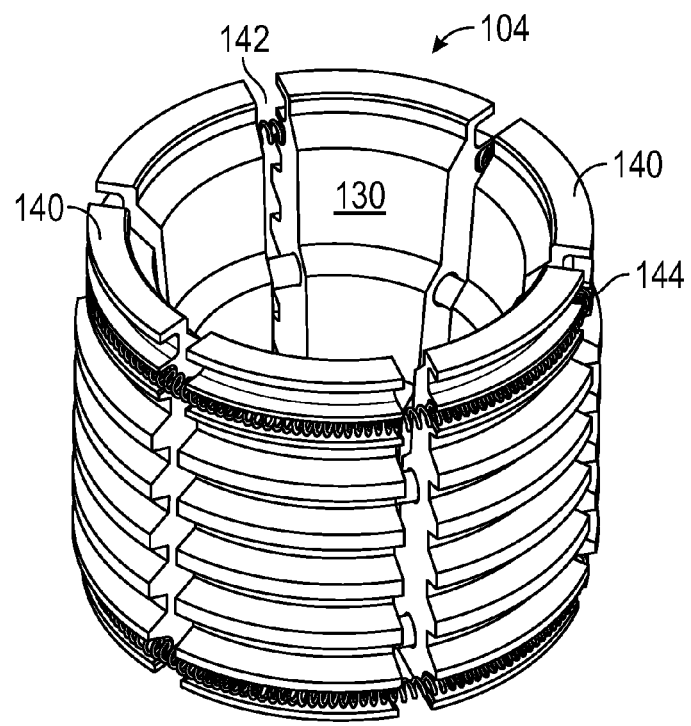
Figure 7C:
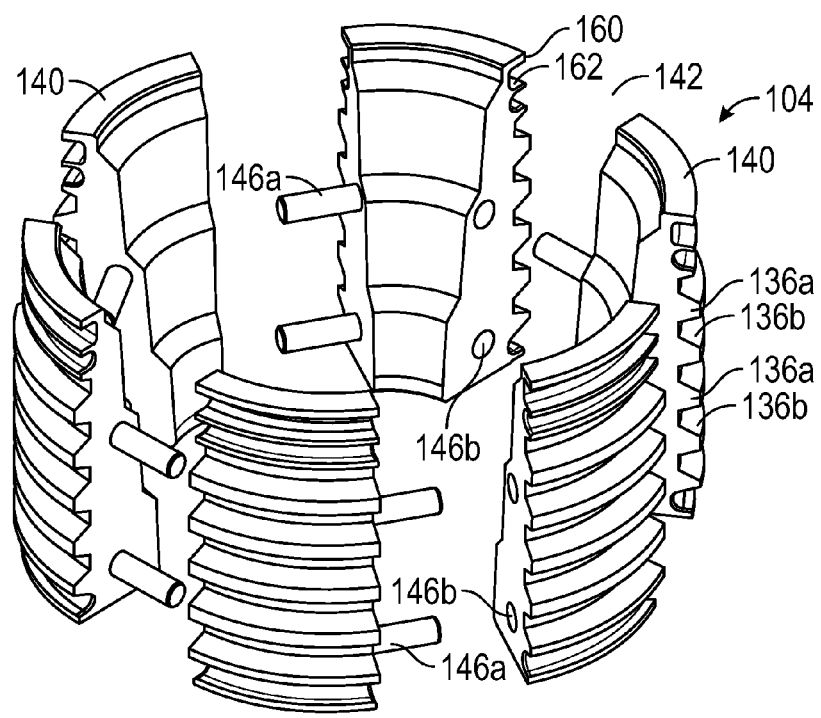
Figure 9:
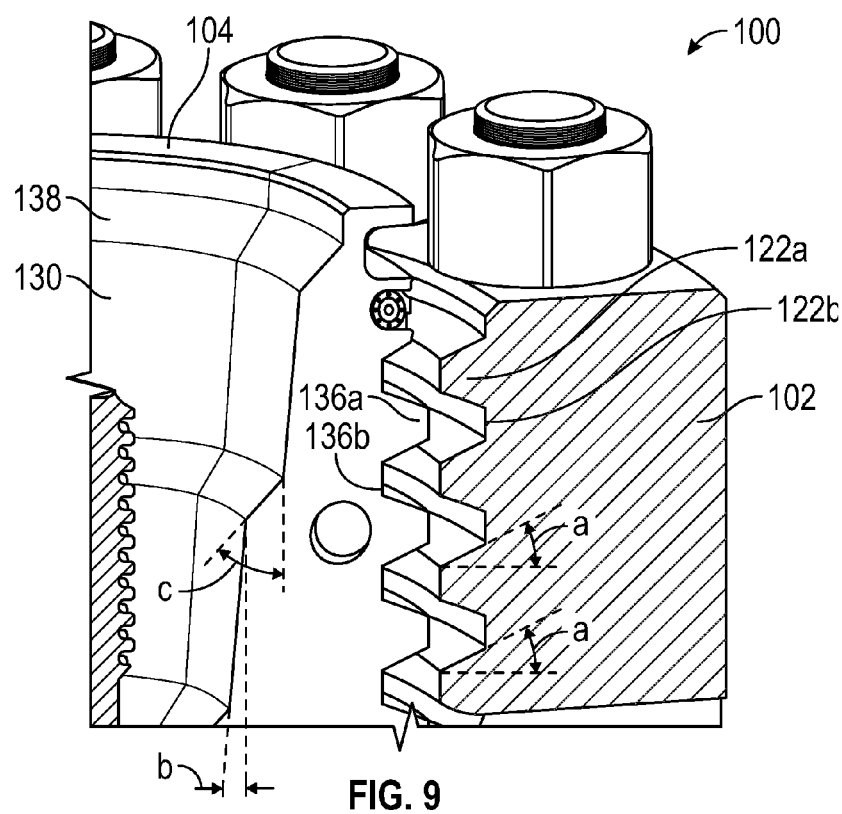
FIG. 9 is a detail view of a portion of FIG. 8B.
Figure 10:
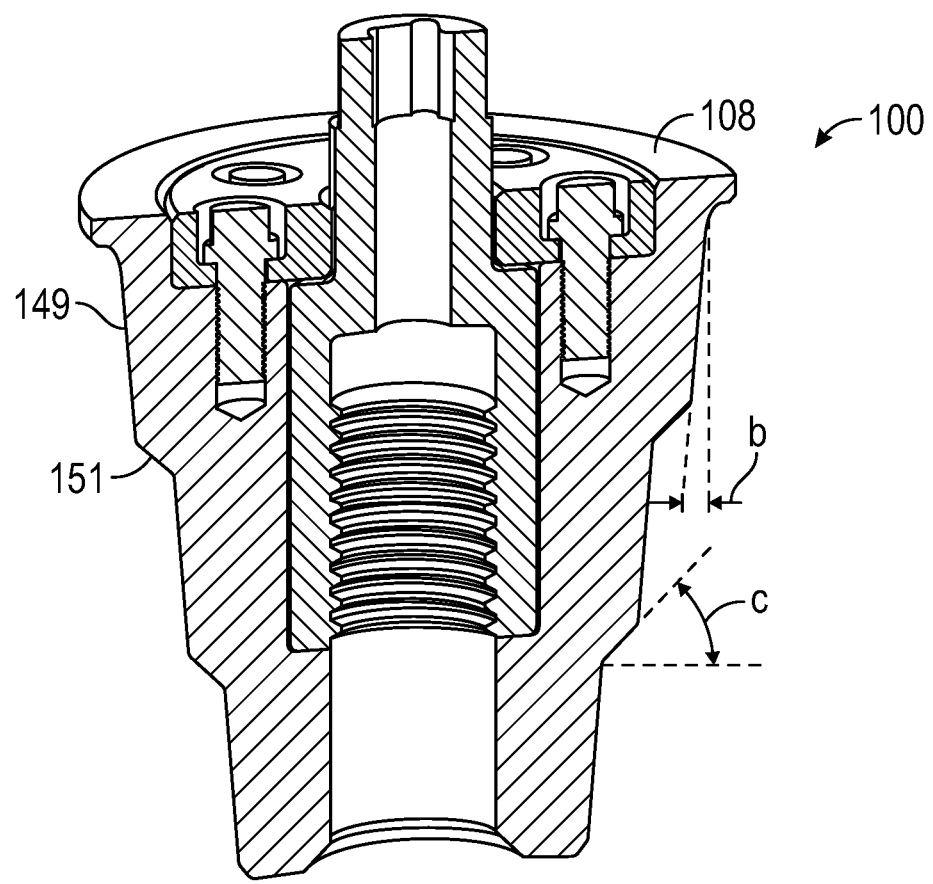
FIG. 10 is a detail view of a portion of FIG. 6.

FIG. 4 is a perspective view of one of many embodiments of a valve cover lock assembly 100 according to the disclosure. FIG. 5 is a perspective exploded view of the valve cover lock assembly 100 of FIG. 4. FIG. 6 is a cross-sectional view of the valve cover lock assembly 100 of FIG. 5. FIGS. 7A, 7B and 7C are perspective views of one of many embodiments of a valve cover lock insert 104 according to the disclosure. FIGS. 8A, 8B, 8C and 8D are perspective cross-sectional views of a fluid end module 300 having one of many embodiments of a valve cover lock assembly 100 according to the disclosure. FIG. 9 is a detail view of a portion of FIG. 8B. FIG. 10 is a detail view of a portion of FIG. 6. FIGS. 4-10 will be described in conjunction with one another. A system for locking a valve cover, or valve cover lock assembly 100, can include a ring 102 and an insert 104 for coupling a valve cover 106 to a fluid end module 300, such as for selectively locking a valve cover 106 in place relative to module 300. Insert 104 can be adapted to couple to ring 102, and a valve cover lock assembly 100 can include an actuator, such as a cone 108, for supporting coupling and uncoupling of insert 104 and ring 102, whether separately or in combination with one or more other components of a pump system. Ring 102 can be adapted for coupling to a mud pump or portion thereof, such as to module 300 or another component of a pump fluid end, for supporting, sealing, or capping one or more fluid flow paths, bores or openings, such as flow path 110 or valve cover opening 112. A ring 102 can have any size or shape required by a particular application, and can but need not be annular. As shown in FIGS. 4-6 for illustrative purposes, ring 102 can be round or circular, but need not be, and alternatively ring 102 can be another shape such as triangular, square or otherwise polygonal. Ring 102 can include one or more openings, such as a central longitudinal opening 114, for communicating with valve cover opening 112 and for housing at least a portion of one or more other components of assembly 100. Ring 102 can have a first end 102a for coupling with a module 300 and a second and 102b, such as a longitudinally opposite end. Ring 102 can be adapted to couple with module 300 in any manner required or desired for an application or embodiment, which can, but need not, include being adapted to couple with one or more fasteners 116, such as screws, bolts, studs, or other couplers. Alternatively, one or more fasteners 116 can be absent and ring 102 can be otherwise coupled to module 300, such as by welding or by being formed integrally therewith, in whole or in part.

Ring 102 can, but need not, include one or more other openings or holes, such as access ports 118, for supporting coupling and uncoupling ring 102 or one or more other components of assembly 100. Ring 102 can include an interior wall 120 having one or more couplers 122 for coupling with one or more other components of the system, as further discussed below. In at least one embodiment, which is but one of many, coupler 122 can be or include one or more male couplers 122a and/or one or more female couplers 122b, which can, but need not, be or include a series or collection of extensions and grooves. In at least one embodiment, opening 114 can be arranged for allowing one or more other components of the system to be disposed at least partially therein or there through, which can include having a dimension or diameter sufficient to allow a valve cover 106 to pass through ring 102 and into (or out of) valve cover opening 112, which can be any dimension or diameter appropriate for a valve cover or fluid pump at hand. Opening 114 can, but need not, be uniform along its length and can, but need not, be equal to or greater than valve cover opening 112 in size. In at least one embodiment, opening 114 can be of any size sufficient to allow one or more other components of a pump or fluid end to be installed or removed through ring 102, such as, for example, a valve cover stud 124, a valve guide 126, or a valve poppet 128, whether separately or in combination.

Insert 104 can include a first end 104a for supporting (directly or indirectly) valve cover 106 in one or more positions, such as in an installed position, and a second end 104b, such as a longitudinally opposite end. As further described below, first end 104a of insert 104 can be disposed against valve cover 106 and adapted to at least partially resist movement of valve cover 106, such as when valve cover 106 is installed in module 300, or seated with valve cover opening 112, and assembly 100 is in a locked position. Insert 104 can have an interior wall 130 for cooperating with cone 108, an exterior wall 132 for cooperating with interior wall 120 of ring 102, and an opening 134 there through. Exterior wall 132 can be adapted for coupling with interior wall 120 of ring 102 and can include one or more couplers, such as one or more male couplers 136a and one or more female couplers 136b, separately or in combination. In at least one embodiment, interior wall 130 of insert 104 can be angled or sloped from one end of insert 104 to another, or along a lesser portion, which can include having an interior dimension or characteristic, such as a diameter or cross-sectional area, that varies or changes along a length of opening 134. Interior wall 134 can, but need not, include one or more steps 138, such as angled transitions between two or more sections or portions of wall 134. Alternatively, step(s) 138 can be absent and wall 134 can be of a smooth taper, in whole or in part.

Insert 104 can include a plurality of segments 140, which can be or include any number of segments, such as 2, 3, 4, 5, 6, 7, 8, 9, 10 . . . n segments, where n can be a number up to and including 1000, or even 10,000 (or more). Segments 140 can collectively form interior wall 130 and exterior wall 132 of insert 104, which walls can, but need not, be solid or continuous, separately or in combination, in whole or in part. In at least one embodiment, walls 130 and 132 can be continuous when insert 104 is in one or more positions and can be segmented when insert 104 is in one or more other positions. For example, insert 104 can have a fully retracted position, such as a position wherein 104 may have a minimum external dimension or diameter, a fully expanded position, such as a position where an insert 104 may have a maximum external dimension or diameter, which dimensions can be any dimensions according to a particular application at hand, and one or more interim positions between the fully expanded and fully retracted positions. As another example, a fully expanded position can include a position wherein insert 104 may be coupled to ring 102, regardless of whether insert 104 may be "fully" retracted in a physical sense. In a fully retracted position, two or more segments 140 of insert 104 can be disposed adjacently to one another, which can, but need not, include being wholly or partially in contact with one another. However, this need not be the case, and in at least one embodiment, two or more segments 140 can have a gap 142 there between when insert 104 is in a fully retracted (or other) position.

In at least one embodiment, which is but one of many, insert 104 can be sized for fitting within opening 114 of ring 102 when in one or more retracted or partially expanded positions, which can include one or more unlocked positions, and for having an external dimension greater than a dimension, such as a minimum internal dimension, of opening 114 when in one or more partially expanded or fully expanded positions, which can include one or more locked or otherwise coupled positions. Insert 104 can, but need not, include one or more retainers 144, such as a spring, elastic band, or other biasing device, for holding segments 140 in one or more positions relative to one another, which can include biasing segments 140 radially inwardly toward a retracted or fully retracted position. One or more segments 140 of insert 104 can, but need not, include one or more couplers 146a, 146b (collectively, couplers 146) for movably coupling adjacent segments to one another when segments 140 are in one or more positions. For example, in at least one embodiment, couplers 146 can include one or more male couplers, such dowels or other extensions, and one or more female couplers, such as holes or openings, for receiving at least a portion of a corresponding male coupler of an adjacent or next segment 140. For instance, two or more adjacent segments 140 can include a combination of dowels and corresponding openings having a clearance or other fit there between for allowing the segments to move relative to one another during actuation of insert 104, as further described below. Each segment 140 can include any number of male couplers and/or female couplers 146, separately or in combination, or alternatively couplers 146 can be absent from one or more segments (including all segments) of insert 104.

Cone 108 can include a first end 108a and a second end 108b and can have one or more openings, such as a central longitudinal opening 148, for cooperating with one or more other components of the system, such as, for example, for coupling with a valve cover 106, valve cover stud 124, or a cone nut 150 for coupling cone 108 to another component of the system. Cone 108 can have an interior wall 147 and an exterior wall 149, which can be configured for cooperating with interior wall 130 of insert 104, such as during actuation of assembly 100. For example, exterior wall 149 of cone 108 can be angled or sloped from one and of insert 104 to another (or otherwise along at least a portion of its length), which can include having one or more dimensions or other attributes, such as a diameter or cross-sectional area, that varies or changes along cone 108. Exterior wall 149 can, but need not, include one or more steps 151, such as angled transitions, between two or more sections or portions thereof. Alternatively, step(s) 151 can be absent and wall 149 can be of a smooth taper, in whole or in part. In at least one embodiment, exterior wall 149 of cone 108 can have a size and shape similar to or the same as that of interior wall 130 (or a portion thereof) of a corresponding insert 104. Cone 108 can, but need not, be formed from a plurality of segments. Cone nut 150 can include a first end 150a for coupling with a valve cover 106 and a second end 150b for receiving rotational force from a tool, such as a wrench, socket, driver or other apparatus, for tightening or loosening a fastener. For example, second end 150b of cone nut 150 can include a hex drive, square drive or other tool coupler, such as a torx drive, separately or in combination, in whole or in part. In at least one embodiment, which is but one of many, at least a portion of cone nut 150 can be disposed within opening 148 for freely rotating relative to cone 108, such as by having a clearance fit therewith. Cone 108 can, but need not, include a cone nut retainer 152, such as a washer, ring, or other structure, for coupling cone nut 150 to cone 108. At least a portion of cone nut 150 can, but need not, extend from second end 108b of cone 108, which can include being disposed at least partially through retainer 152, such as through an opening 154. Retainer 152 can be coupled to cone 108 in any manner, such as by one or more fasteners 156, or in another manner (e.g., welded), separately or in combination, in whole or in part. In at least one embodiment, cone nut 150 can include threads adapted to couple with a valve cover stud 124 or another threaded portion of a valve cover 106, but this need not be the case, and alternatively, or collectively, cone nut 150 can include another type of coupler or structure for coupling cone 108 to valve cover 106 during installation or use of assembly 100.

With continuing reference to FIGS. 4-7A and specific reference to FIGS. 8A-8D, one or more methods of installing and/or removing assembly 100 from a pump fluid end will now be described. These methods can include an initial installation in a fluid end having no valve cover lock system and/or replacement of an existing valve cover lock assembly, such as a conventional lock assembly, one or more of the systems disclosed herein, or another valve cover lock, whether now known or later developed. In at least one embodiment, a fluid end module 300 can include a poppet 128 slideably disposed in a fluid path 110, which can be or include a bore or cylinder, for selectively allowing fluid to move along the fluid path during pumping. Poppet 128 can be coupled to one or more other pump components, such as valve guide 126 or other parts for supporting valve movement or operation, which can include being coupled to valve cover 106, directly or indirectly, in whole or in part. Valve cover 106 can be disposed at least partially within fluid path 110 and/or valve cover opening 112, which can include being at least partially sealingly coupled with or seated upon opening 112, or a structure about opening 112, such as valve cover seat 158. In at least one embodiment, ring 102 can be coupled to fluid end module 300, such as to surface 302, and valve cover 106 can be passed through ring 102 and into opening 112. However, this need not be the case, and alternatively, or collectively, valve cover 106 and/or other pump components can be installed in fluid end module 300 and ring 102 can thereafter be coupled to fluid end module 300. As shown in FIGS. 8A-8D for illustrative purposes, ring 102 can be coupled to fluid end module 300 with one or more fasteners 116 or in another appropriate manner, which can include the use of welding, adhesives, unitary formation and so forth, whether separately or in combination, in whole or in part. Valve cover stud 124 can be disposed at least partially within opening 114 of ring 102, such as for coupling with one or more other components of assembly 100. Opening 114 can, but need not, include at least a portion having a larger dimension or area than valve cover opening 112, such as a portion proximal to or defined by first end 102a of ring 102, which can provide for a rim 304, such as a border or landing, between valve cover opening 112 and ring 102.

Insert 104 can be inserted or otherwise disposed at least partially within opening 114 of ring 102 and placed against valve cover 106, which can include being placed in contact with cover 106 directly or indirectly with one or more intermediate structures (e.g., gaskets, plates or other supports) there between, separately or in combination, in whole or in part. Segments 140 of insert 104 can be installed collectively as a single unit or separately in numbers of one or more, whether with or without one or more retainers 144 or couplers 146. In at least one embodiment, insert 104 can comprise a plurality of segments 140 movably held together in an annular formation with one or more retainers 144 and/or couplers 146 (if present), and can be simultaneously disposed within ring 102 as one component, such as in a retracted position wherein adjacent segments 140 may or may not touch, depending on the embodiment (see, e.g., FIG. 8B). First end 104a of insert 104 can, but need not, be of a size equal to or less than that of valve cover 106, and in at least one embodiment can be larger than valve cover 106 so as to contact or potentially contact rim 304, whether in one or more contracted or expanded arrangements.

Figure 8A:
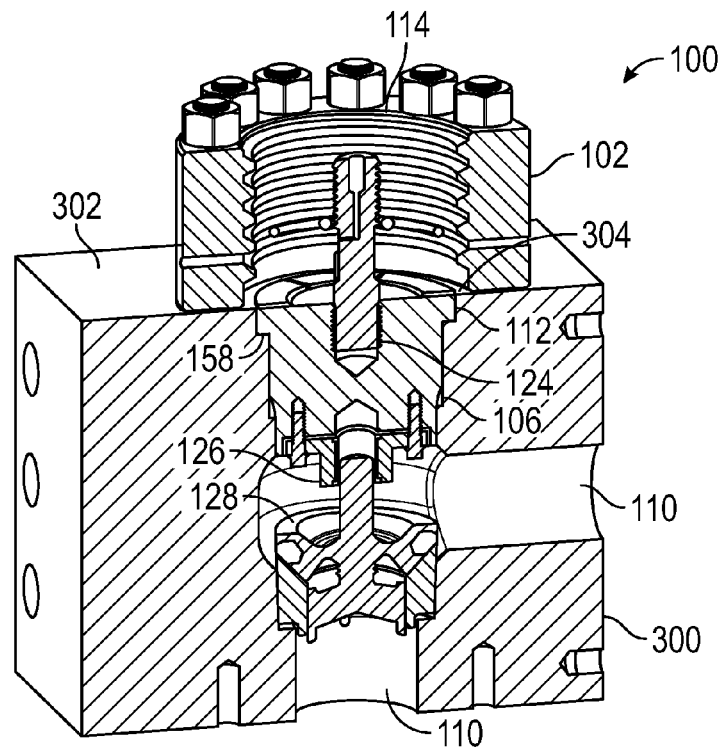
FIGS. 8A, 8B, 8C and 8D are perspective cross-sectional views of a fluid end module having one of many embodiments of a valve cover lock assembly according to the disclosure.
Figure 8B:
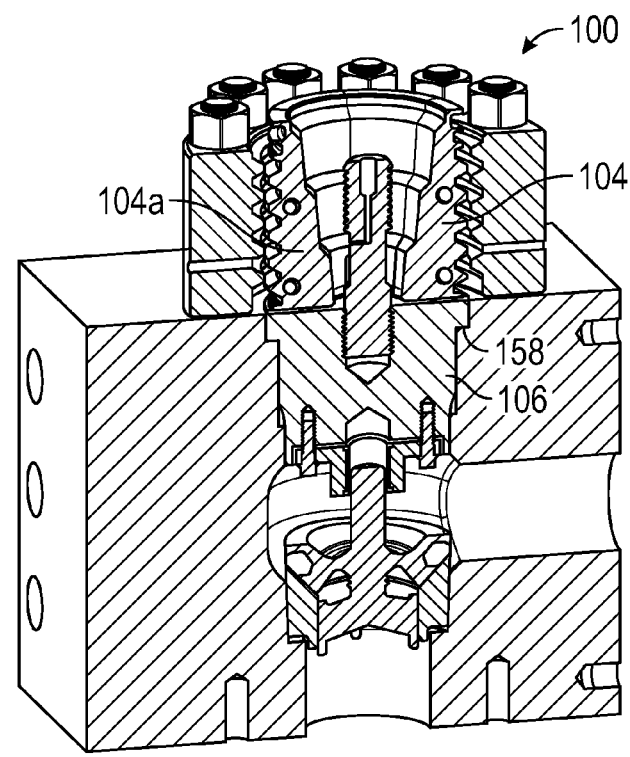
Figure 8C:
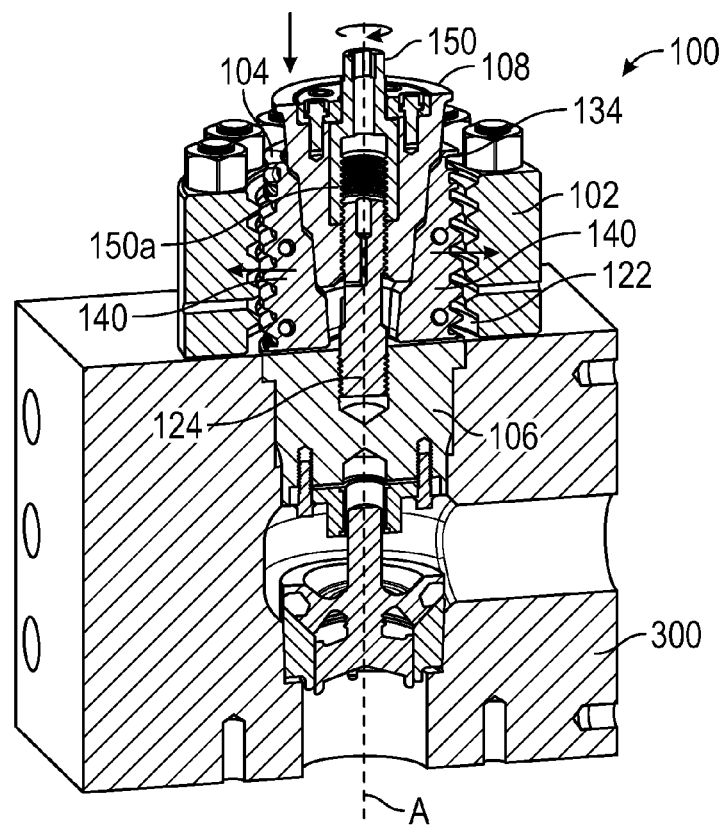

As shown in FIG. 8C, cone 108 can be inserted or otherwise disposed at least partially within opening 134 of insert 104, which can include disposing at least a portion of exterior wall 149 of cone 108 in contact with interior wall 130 of insert 104 or a portion thereof. In an embodiment wherein cone 108 and insert 104 comprise portions (whether unitary of otherwise) separated or transitioned by steps 138, 151, which is but one embodiment of many, one or more of the respective portions or steps can, but need not, be placed in contact with one another upon initial insertion of cone 108. Cone 108 can be inserted into opening 134 and first end 108a can contact or otherwise be disposed relative to valve cover 106 or a portion thereof, such as valve cover stud 124. For instance, first end 108a can be disposed about at least a portion of stud 124, which can be disposed at least partially within opening 148 of cone 108 and placed in contact with first end 150a of cone nut 150. Cone 108 can be coupled to valve cover 106, such as by threading cone nut 150 onto stud 124. Cone nut 150 can be progressively tightened to stud 124 (or another portion of valve cover 106), which can force cone 108 and valve cover 106 toward fluid end module 300 (e.g., downwardly as shown in the example arrangement of FIGS. 8C and 8D). Additionally, exterior wall 149 of cone 108 can wholly or partially engage interior wall 130 of insert 104 for wedging or otherwise moving segments 140 of insert 104 radially outwardly (relative to axis A) toward interior wall 122 of ring 102, as indicated by the arrows in FIGS. 8C and 8D. In at least one embodiment, cone 108 can apply force to insert 104 in both the radial and axial directions, which can include applying such forces simultaneously.

Figure 8D:
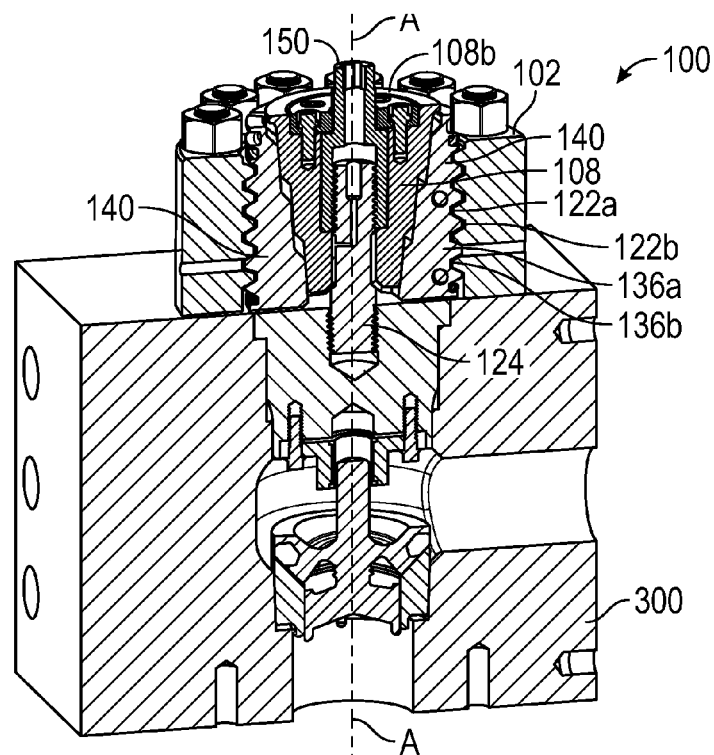

As shown in FIG. 8D, cone 108 can move progressively closer to module 300 and segments 140 can move progressively closer to ring 102 as cone 108 is coupled to valve cover 106, such as by coupling cone nut 150 to valve cover stud 124. Furthermore, one or more couplers 136a, 136b of insert 104 can engage or otherwise couple to one or more couplers 122a, 122b of ring 102, such as to corresponding couplers, depending on which of the respective couplers are present. For example, in the embodiment of FIGS. 8C and 8D shown for illustrative purposes, which is but one embodiment of many, each of ring 102 and insert 104 can include an array or other plurality of male and female couplers 122a, 122b and 136a, 136b, respectively, and, for example, ring 102 and insert 104 can collectively include sets of corresponding couplers that couple with one another as insert 104 expands into ring 102 or, more specifically, into contact with interior wall 122 of ring 102. However, this need not be the case, and alternative arrangements are possible, as will be understood by one of ordinary skill in the art having the benefits of the present disclosure. For example, insert 104 can include one or more male couplers and ring 102 can include one or more female couplers, or vice versa, ring 102 and insert 104 can have equal numbers of couplers or different numbers of couplers, whether as between one another or as between male and female couplers on one component or the other.

Assembly 100 can include one or more locked positions, which can include a fully locked position (see, e.g., FIG. 4), such as a position wherein cone 108 is coupled to insert 104, and couplers 122, 136 are coupled, sufficiently to at least partially limit or prevent axial movement of valve cover 106 away from module 300 or valve cover opening 112 during pumping operations. As another example, a fully locked position can include a position or coupling sufficient to at least partially resist or prevent cone nut 150 from loosening or cone 108 from retracting, such as due to vibrations or other forces experienced during pumping. When assembly 100 is in a locked position, whether a fully locked or otherwise locked position, at least a portion of one or more system components, such as cone 108 or cone nut 150, can, but need not, protrude from opening 134 of insert 104 and/or opening 114 of ring 102. Similarly, cone nut 150 can, but need not, be fully seated on stud 124 (if present) and cone 108 can, but need not, directly or indirectly contact valve cover 106. As other examples, cone 108 can at least partially protrude from insert 104, and insert 104 can at least partially protrude from ring 102. In at least one embodiment, insert 104, such as second end 104b, can include one or more structures for gripping or holding insert 104 during insertion or removal of insert 104 from ring 102, such as, for example, a rim 160 or groove 162 (see FIG. 7C).

With continuing reference to FIGS. 4-8D and specific reference to FIGS. 9 and 10, assembly 100 can include couplers 122a, 122b and 136a, 136b, having one or more of many different profiles for coupling with one another. Similarly, assembly 100 can include a cone 108 and insert 104 having one or more of many different wall profiles for coupling with one another. Such profiles can be uniform along all or a portion of each component, or they can differ. As shown for exemplary purposes in FIG. 9, in at least one embodiment, couplers 122, 136 can have a truncated V-shaped profile or cross-sectional shape with a taper or angle a of 22.5 degrees or about 22.5 degrees. However, this need not be the case and alternatively, or collectively, assembly 100 can include couplers 122, 136 having other angles a, which can include angles of greater than or less than 22.5 degrees, such as angles between 0 degrees and 90 degrees (inclusive), separately or in combination, in whole or in part. In at least one embodiment, angle a can be or include an angle sufficient to provide for coupling of assembly 100 sufficiently to at least partially withstand a force (such as an axial force) applied to insert 104 during pumping, which can be any force according to an embodiment. As shown for exemplary purposes in FIGS. 9 and 10, in at least one embodiment, one or more of interior walls 130, 149 of insert 104 and cone 108, respectively, can have an angle b for coupling to one another. For example, angle b can, but need not, be or include a "locking" angle or taper, such as an angle of 6 degrees, about 6 degrees, or less than 6 degrees. In at least one embodiment, angle b can be 5 degrees or about 5 degrees, or 4 degrees or about 4 degrees. In at least one embodiment, angle b can be an angle for creating a frictional force between insert 104 and cone 108 sufficient to at least partially withstand a force (such as an axial force) applied to insert 104 during pumping, which can be any force according to an embodiment. As another example, in at least one embodiment, angle b can be or include an angle within a range of approximately 0 degrees to approximately 45 degrees (inclusive), or within a range of approximately 1 degree to approximately 20 degrees (inclusive). However, it should be understood that one or more mechanical advantages can differ among angles of different values. For instance, in at least one embodiment, relatively smaller angles, such as an angle b of about 15 degrees or less, can result in more desirable coupling forces than relatively larger angles.

As also shown for exemplary purposes in FIGS. 9 and 10, in at least one embodiment, one or more of interior walls 130, 149 of insert 104 and cone 108, respectively, can have one or more steps 138, 151 with an angle c for coupling to one another. For example, angle c can, but need not, be or include an angle or taper of 45 degrees or about 45 degrees. In at least one embodiment, angle c can be greater than or less than 45 degrees, such as, for example, within a range of approximately 30 degrees to approximately 60 degrees (inclusive), or as another example, within a range of approximately 0 degrees to approximately 90 degrees (inclusive). In an embodiment wherein a dimension of assembly 100 allows, such as an axial or longitudinal dimension (e.g., an overall length), angle c can, but need not, be greater than 45 degrees, which can result in a relatively longer (or otherwise larger) assembly as compared to an embodiment having a lesser angle c. As another example, angle c can be less than 45 degrees, which can result in a relatively shorter (or otherwise smaller) assembly as compared to an embodiment having a greater angle c.

Turning to unlocking of assembly 100, such as during servicing of a pump or fluid end or replacing one or more pump components, the components of assembly 100 can be uncoupled or removed from one another or from fluid end module 300 by generally reversing the steps described herein with regard to locking or installation of assembly 300. In at least one embodiment, one or more retainers 144 (if present) can aid in retracting segments 140 of insert 104 upon uncoupling, such as during or after removal of cone 108 or cone nut 150. For example, one or more retainers 144 (if present) can bias one or more of segments 140 radially inwardly, which segments can be removed collectively, individually or otherwise. In at least one embodiment, one or more access ports 118 (if present) can aid in retracting segments 140 of insert 104 upon uncoupling, such as by providing access to one or more segments 140 for applying lubricant or other substances along the interface of insert 104 and ring 102 or, as another example, by providing access to one or more segments 140 for the application of force to the exterior thereof, such as a radially inward force that can be applied by a rod, punch or other tool.

As will be understood by one of ordinary skill in the art having the benefits of the present disclosure, the torque or force that can be needed to properly or fully tighten assembly 100 to a module 300 can depend on various embodiment-specific factors, such as, for example, the operating pressure(s) of the pump, the type(s) of fluid(s) being pumped and the size(s) and material(s) of the various components of the system, among others, which can be or include any factor or variable relevant for a particular embodiment at hand, such as a commercial embodiment. As an example, in at least one embodiment, which is but one of many, approximately 460-690 ft-lbs of torque can achieve approximately one to one and one-half times a preload for a 7500 PSI mud pump, which can exert approximately 250,000 to 350,000 pounds force on one or more components, such as a valve cover, during operation. In such an embodiment, a valve cover lock assembly or system according to the present disclosure can be structured to withstand approximately four times a static load applied during pumping, and a cone nut can include one or more of a 1$\frac{7}{16}$ inch hex drive and a ¾ inch square drive. However, this need not be the case and many other sizes and arrangements are possible, including embodiments having none (or less than all) of the aforementioned characteristics.

The components and other features disclosed herein, such as ring 102, insert 104, segments 140 and cone 108, can be formed in any manner(s) and from any material(s) (e.g., plastic, metal, steel, stainless steel, composite and/or other material(s)) required or desired for a particular application or embodiment at hand, and can be made separately or collectively, in whole or in part. One or more of the components can, but need not, be treated, such as by case hardening, heat treating or another method for improving or changing the characteristics of a material. One or more of the components can, but need not, be made from the same material(s), in whole or part, and in at least one embodiment, the material(s) can differ from one component to another. For example, adjacent or other components can include materials of differing hardnesses or other characteristics (e.g., mechanical properties, chemical properties).

In at least one embodiment, a system for coupling with, securing, holding or otherwise supporting a valve cover, such as a valve cover lock system, valve lock, or valve cover lock assembly, can include one or more components for coupling to a pump, such as to a fluid end, (or fluid end module), valve cover opening, bore, cylinder, flow path, inlet, outlet, or other portion of a pump, whether directly or indirectly, separately or in combination, in whole or in part. In at least one embodiment, a system can include a support member, such as a ring or base, having one or more openings or fluid paths, one or more walls and one or more surfaces. A ring can be adapted to couple to a module and can have an opening adapted to be in fluid communication with one or more openings in the pump, such as a valve cover opening. A system can include another member, such as an insert or head, which can have one or more openings and which can comprise one or more segments, such as a plurality of segments or other portions, that can collectively form one or more walls or surfaces, such as interior walls and surfaces and exterior walls and surfaces, of the member. An insert or other member can be disposed at least partially within an opening of one or more other components, such as a ring. In at least one embodiment, a system can include an actuator, such as a cone or wedge, having one or more openings, such as an opening therein or there through, and one or more walls, such as an interior wall and an exterior wall, and the actuator can be disposed at least partially within an opening of one or more other components, such as an opening in an insert or ring. In at least one embodiment, a system can include one or more couplers, such as a cone nut, for coupling one or more system components, which can be disposed at least partially within an opening in or through one or more other components, such as a cone or other actuator. A cone nut can have one or more ends adapted to couple with one or more other components, such as a valve cover. In at least one embodiment, a system can include one or more couplers or sets of couplers, and one or more components comprising one or more couplers. A wall of a ring can include one or more couplers and an insert can include one or more couplers adapted to couple with one or more of the couplers of the ring. A cone can be adapted to move in one or more directions relative to other components of the system, and can be adapted to move a plurality of segments in one or more directions, such as radially outwardly or otherwise relative to a component or axis. A cone can be adapted to move in a direction until one or more couplers are coupled. One or more couplers can be adapted to at least partially resist axial movement of one or more components relative to one another or to another structure, such as when the one or more couplers are in one or more coupled or locked positions.

In at least one embodiment, a system can include a valve cover coupled to an end of a coupler, and a coupler can be adapted to move a cone and a valve cover toward one another, such as when the coupler is tightened, rotated, or otherwise moved to a coupled position from one or more other positions. A system can include one or more components, such as a cone or insert, having walls or surfaces of differing shapes or sizes along at least a portion of a dimension, which can include one or more tapered or otherwise angled walls or portions. In at least one embodiment, a cone can have one or more tapered walls, such as a tapered exterior wall, and an insert can have one or more tapered walls, such as an exterior wall, which walls can, but need not, be of the same or similar geometries. A tapered structure can, but need not, include one or more steps or other angled transitions, such as between or along one or more sections, segments, lengths, interfaces or other portions of a structure. A taper or step can have one or more angles, such as angles relative to the horizontal, vertical or another direction or axis, which can be any angle for accomplishing a function of a component having a taper or step. In at least one embodiment, a system can include a cone having a wall, and at least a portion of the wall can include a taper of 6°, about 6°, less than 6° or greater than 6°. In at least one embodiment, a system can include an insert having a wall, and at least a portion of the wall can include a taper of 6°, about 6°, less than 6° or greater than 6°.

In at least one embodiment, a system can include a valve cover coupled to an end of a nut, such as a cone nut, one or more couplers can be adapted to at least partially resist axial movement of one or more components, such as a valve cover, relative to one or more other components, such as a pump, module or portion thereof, for example, when one or more couplers are coupled. A system can include a valve cover, which can include a stud or other coupler adapted to couple to one or more other components, such as to an end or other portion of a cone nut. A system can include a retainer, such as a cone nut retainer, coupled to a cone, and the retainer can have one or more openings and one or more portions, such as ends, disposed relative to one or more other components, such as a portion disposed at least partially within, through, near, below or above an opening in a retainer. In at least one embodiment, a cone nut can be rotatably or otherwise moveably coupled to a cone, and can include one or more ends adapted to receive rotational or other force or torque, such as from a tool. In at least one embodiment, a system can include first, second and/or other couplers, which can include male and female mating structures or other coupling structure(s), such as extensions, rims, rings, splines, grooves, openings, slots, tongues, pins, blocks, receivers, teeth, rods, openings, profiles, or other couplers, separately or in combination, in any number, in whole or in part. In at least one embodiment, one or more couplers can include one or more extensions and one or more grooves, such as structures and spaces or openings adapted to mate, interface, fit or otherwise couple with one another, removably, temporarily, forcibly, freely, tightly, loosely, or otherwise. In at least one embodiment, a system can include one or more couplers having any of a plurality of shapes, sizes, geometries, cross-sections or profiles, such as V-shaped, truncated V-shaped, triangular, round, curved, arced, oblong, chamfered, buttress-shaped, square, spherical, polygonal, or otherwise-shaped. In at least one embodiment, a system can include one or more couplers or portions having one or more tapers, such as a taper or angle of 22.5°, about 22.5°, less than 22.5° or more than 22.5°, separately or in combination, in whole or in part.

In at least one embodiment, a system can include a ring having a portion, such as a body having one or more walls, with one or more holes or other openings therein or there through, such as from an interior wall to an exterior wall. A system can include an insert having a plurality of segments or other portions, which can include two or more segments, and which can include one or more pairs or sets of adjacent or otherwise associated segments, such as two or more segments movably coupled to one another, such as slideably, expandably, retractably, rotatably, or otherwise. In at least one embodiment, two or more segments can be coupled with one or more couplers, which can include one or more dowels and one or more openings adapted to receive at least a portion of a dowel, such as slideably or by way of a clearance fit. A system can include one or more retainers, such as a spring, band or other biasing device, and a plurality of segments can be coupled to one another with one or more retainers. In at least one embodiment, one or more biasing devices can be elastic, and can be adapted to bias one or more segments in one or more directions, such as radially inwardly or toward one or more positions wherein segments may be close to one another, in contact with one another, spaced from one another, coupled to one another, proximal to one another, distal from one another, or otherwise disposed relative to one another.

A system can include a cone, such as a cone having one or more tapered or angled portions, which can include one or more steps or transitions. In at least one embodiment, a system can include a cone or other component, such as an insert, having a wall or surface with a step or taper at an angle of 45°, about 45°, less than 45° or more than 45°, separately or in combination, in whole or in part. For example, a system can include a cone having an exterior wall including two or more sections or portions, which can include a step between portions, such as a step disposed at an angle of 45° or about 45°, which can include an angle relative to horizontal, vertical or another direction. As another example, a system can include an insert having a wall, such as an interior wall, including two or more sections or portions, which can include a step between portions, such as a step disposed at an angle of 45° or about 45°, which can include an angle relative to horizontal, vertical or another direction. In at least one embodiment, a cone, insert or other component of a system can include ends or other portions of different sizes or shapes, such as one end or portion with a first internal, external or other dimension, and another end or portion with a second internal, external or other dimension different from the first dimension(s), in whole or in part. In at least one embodiment, a system can include two or more segments or portions adapted to optionally move radially inwardly and outwardly relative to an axis, such as a central longitudinal or other axis of one or more components, which can include being adapted to move from, to, among or between one or more contracted positions and one or more expanded positions, or one or more locked positions, unlocked positions, partially locked positions, or partially unlocked positions. In at least one embodiment, a system can include a cone nut adapted to couple with a stud of a valve cover, a cone nut having at least one of a male coupler and a female coupler, a cone nut adapted to couple with a tool, such as a tightening or loosening tool, and a valve cover stud adapted to couple to a cone nut.

In at least one embodiment, a fluid end or fluid end module can include a body and one or more valve cover lock systems or assemblies according to the present disclosure, which can be or include any embodiment(s) of a valve cover lock system or assembly according to the disclosure, separately or in combination, in whole or in part. In at least one embodiment, a mud pump can include a body and one or more valve cover lock systems or assemblies according to the present disclosure, which can be or include any embodiment(s) of a valve cover lock system or assembly according to the disclosure, separately or in combination, in whole or in part. In at least one embodiment, a pump can include a body and one or more valve cover lock systems or assemblies according to the present disclosure, which can be or include any embodiment(s) of a valve cover lock system or assembly according to the disclosure, separately or in combination, in whole or in part. In at least one embodiment, a well system can include a body and one or more valve cover lock systems or assemblies according to the present disclosure, which can be or include any embodiment(s) of a valve cover lock system or assembly according to the disclosure, separately or in combination, in whole or in part. In at least one embodiment, a method can include coupling one or more valve cover lock systems or assemblies according to the present disclosure to a fluid end, fluid end module, pump or well system, which can include coupling any embodiment(s) of a valve cover lock system or assembly according to the disclosure, separately or in combination, in whole or in part, including in any practical, desirable or mechanically feasible manner, which can be any manner according to an embodiment, such as a commercial embodiment. In at least one embodiment, a method can include any of coupling a ring to a pump or portion thereof, coupling an insert to the ring, coupling a cone to the insert, moving the cone, moving the insert, moving one or more segments of an insert, coupling one or more couplers, coupling a an insert to a ring, coupling one or more segments to a ring, moving at least a portion of an insert into a coupling engagement with a ring, coupling a cone to a pump, coupling a cone to a valve cover, and coupling a valve cover in one or more positions for supporting pumping operations.

In at least one embodiment, a valve cover lock assembly for a pump having a fluid end module can include a ring adapted to couple to the module, an insert comprising a plurality of segments, and a cone adapted to couple with the insert, wherein the ring comprises a first coupler and the insert comprises a second coupler configured to couple with the first coupler, wherein the cone is configured to move one or more of the plurality of segments when the cone is moved, and wherein the first and second couplers are adapted to at least partially resist movement of the insert. In at least one embodiment, a pump can have a valve cover lock assembly as described herein. In at least one embodiment, a fluid end can have a valve cover lock assembly as described herein. In at least one embodiment, a fluid end module can have a valve cover lock assembly as described herein. In at least one embodiment, a method of locking a valve cover can include coupling a ring to a valve cover opening, disposing an insert comprising a plurality of segments at least partially within the ring, coupling an actuator to the insert, and coupling the insert to the ring.

Other and further embodiments utilizing one or more aspects of the systems and methods described herein can be devised without departing from the spirit of Applicant's disclosure. For example, the systems and methods disclosed herein can be used alone or to form one or more parts of other valves, locks, valve components and/or fluid control systems, such as pumps or fluid ends. Further, the various methods and embodiments of the valve cover locks can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicant's disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicant's disclosures, but rather, in conformity with the patent laws, Applicant intends to fully protect all such modifications and improvements that come within the scope or range of equivalents of the claims.

What is claimed is:

1. A valve cover lock assembly for a pump having a fluid end module with a valve cover opening, the valve cover lock assembly comprising:
    a ring having an opening there through and an interior wall, wherein the ring is adapted to couple to the module so that the opening through the ring is in fluid communication with the valve cover opening;
    an insert having an opening there through and comprising a plurality of segments that collectively form an interior wall and an exterior wall of the insert, the insert being disposed at least partially within the opening through the ring;
    a cone having an opening there through and an exterior wall, the cone being disposed at least partially within the opening through the insert; and
    a cone nut disposed at least partially within the opening through the cone, the cone nut having a first end adapted to couple with a valve cover;
    wherein the interior wall of the ring comprises a first coupler and the exterior wall of the insert comprises a second coupler configured to couple with the first coupler;
    wherein the cone is configured to move the plurality of segments radially outwardly when the cone is moved in a first direction relative to the insert until the first and second couplers are coupled; and
    wherein the first and second couplers are adapted to at least partially resist axial movement of the insert relative to the ring when the first and second couplers are coupled.

2. The assembly of claim 1, further comprising a valve cover coupled to the first end of the cone nut, wherein the cone nut is configured to move the cone and valve cover toward one another when the cone nut is tightened.

3. The assembly of claim 1, further comprising wherein at least a portion of the exterior wall of the cone is of a stepped taper.

4. The assembly of claim 1, further comprising wherein at least a portion of the interior wall of the insert is of a stepped taper.

5. The assembly of claim 1, further comprising wherein at least a portion of the exterior wall of the cone comprises a taper of 6°, about 6° or less than 6°.

6. The assembly of claim 1, further comprising wherein at least a portion of the interior wall of the insert comprises a taper of 6°, about 6° or less than 6°.

7. The assembly of claim 1, further comprising a valve cover coupled to the first end of the cone nut, wherein the first and second couplers are adapted to at least partially resist axial movement of the valve cover relative to the module when the first and second couplers are coupled.

8. The assembly of claim 7, further comprising wherein the valve cover includes a stud coupled to the first end of the cone nut.

9. The assembly of claim 1, further comprising a cone nut retainer coupled to the cone, the cone nut retainer having an opening there through.

10. The assembly of claim 9, further comprising wherein the cone nut has a second end disposed at least partially within the opening through the cone nut retainer.

11. The assembly of claim 1, further comprising wherein the first and second couplers comprise one or more extensions and one or more grooves.

12. The assembly of claim 11, further comprising wherein the one or more extensions and one or more grooves comprise at least one extension and at least one groove having cross-sectional profiles that are V-shaped, truncated V-shaped or buttress-shaped.

13. The assembly of claim 11, further comprising wherein the one or more extensions and one or more grooves comprise a taper of 22.5° or about 22.5°.

14. The assembly of claim 1, wherein the ring further comprises an exterior wall and one or more through holes from the interior wall to the exterior wall.

15. The assembly of claim 1, further comprising wherein the plurality of segments comprises three or more segments.

16. The assembly of claim 1, further comprising wherein at least one of the plurality of segments is movably coupled to an adjacent one of the plurality of segments.

17. The assembly of claim 1, further comprising a dowel coupled to at least one of the plurality of segments, and wherein at least one of the plurality of segments includes an opening configured to slideably receive at least a portion of the dowel.

18. The assembly of claim 1, further comprising wherein the plurality of segments are coupled together with one or more elastic biasing devices configured to bias the plurality of segments radially inwardly.

19. The assembly of claim 1, further comprising wherein each of the exterior wall of the cone and the interior wall of the insert comprises two tapered sections having a step there between, the step being disposed at an angle of 45° or about 45°.

20. The assembly of claim 1, further comprising a valve cover adapted to couple to the cone nut, wherein the first end of the cone nut is adapted to couple with a threaded portion of the valve cover.

* * * * *